Aug. 20, 1940.　　　　　O. D. RICE　　　　　2,211,988
AUTOMATIC CONTROL SYSTEM FOR FURNACES
Filed Jan. 14, 1938　　　　3 Sheets-Sheet 3

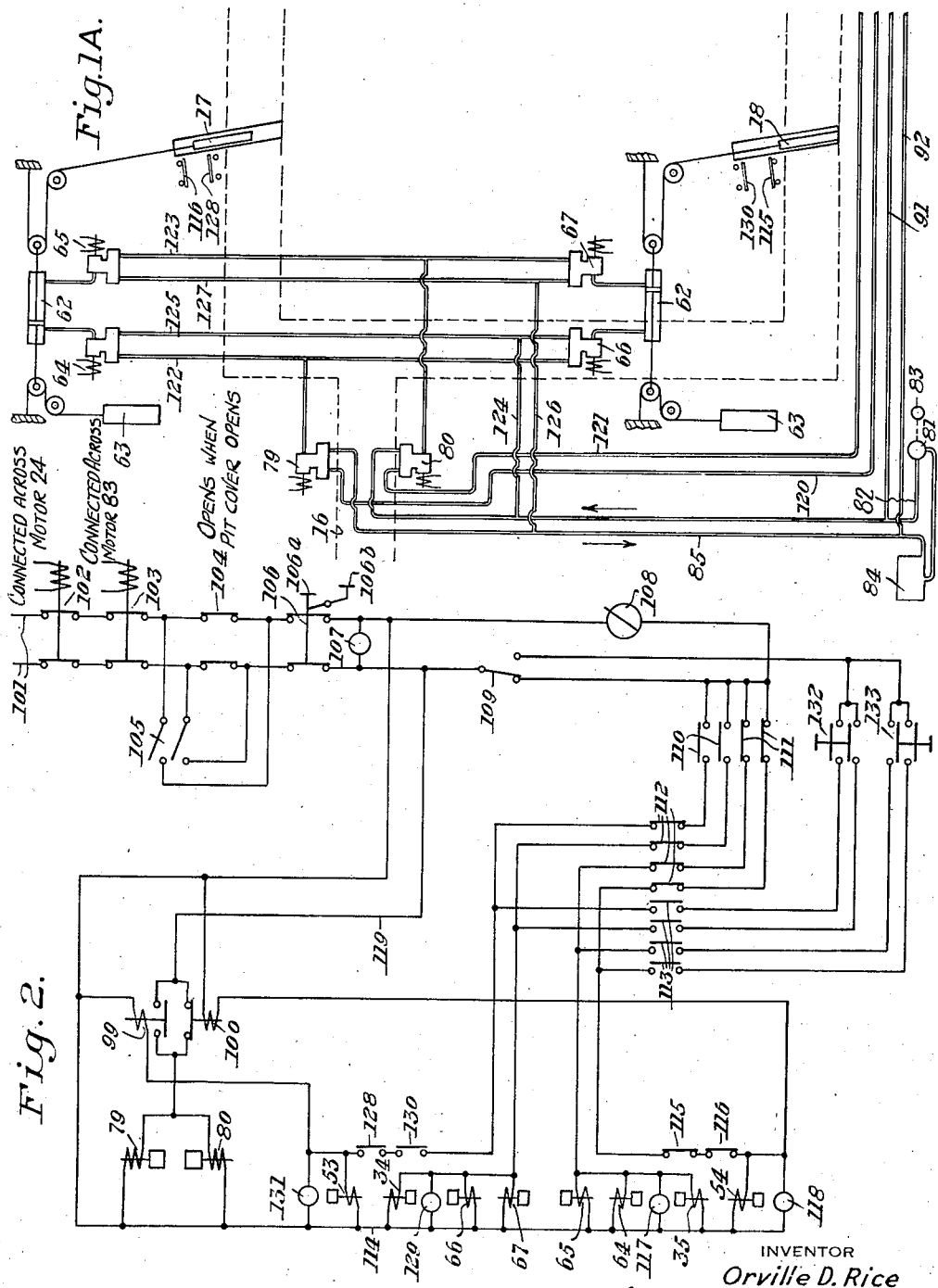

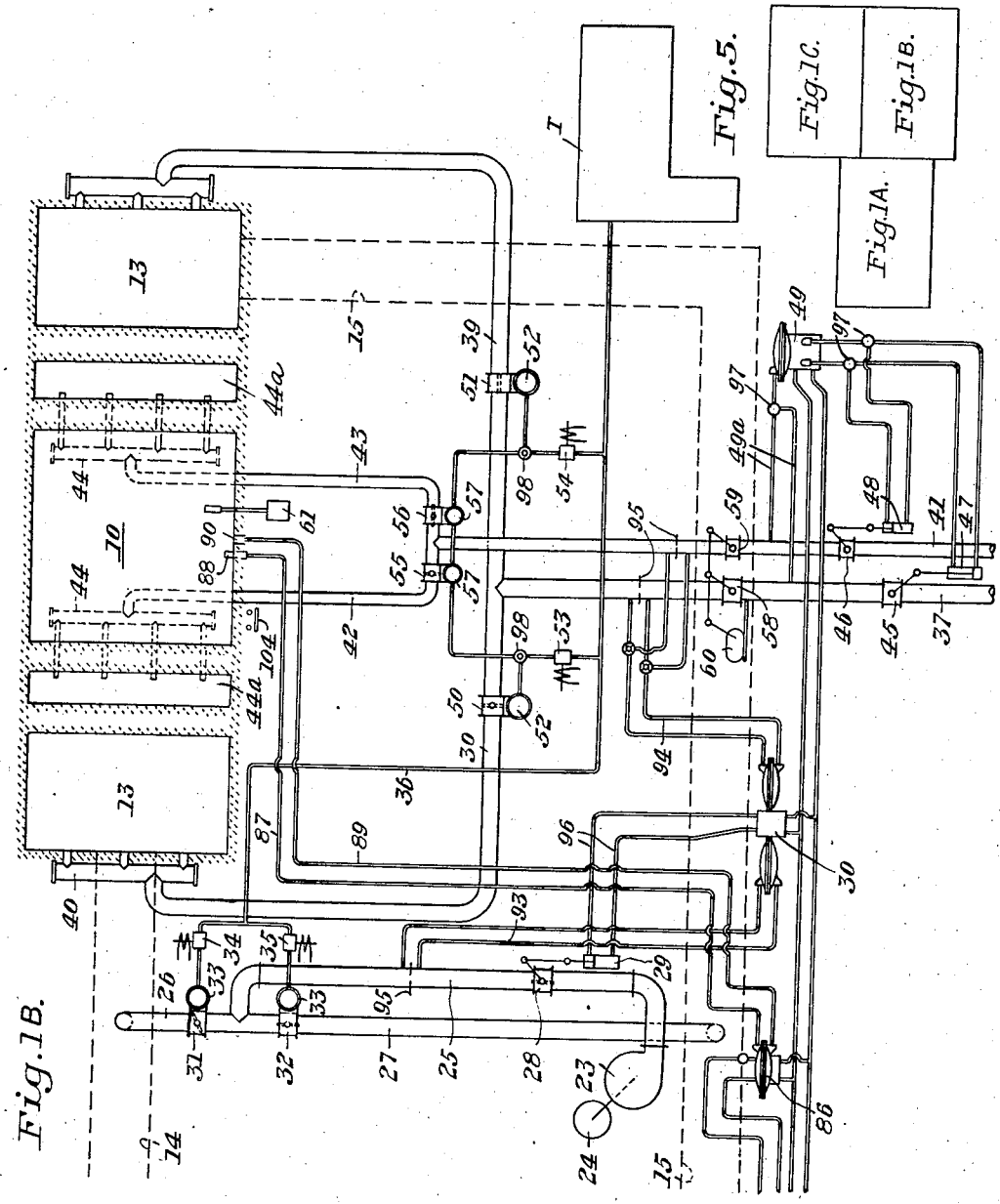

INVENTOR
Orville D. Rice
by his attorneys
Stebbins, Blenko
& Parmelee

Patented Aug. 20, 1940

2,211,988

UNITED STATES PATENT OFFICE 2,211,988

AUTOMATIC CONTROL SYSTEM FOR FURNACES

Orville D. Rice, Mount Lebanon, Pa., assignor to The Rust Furnace Company, Pittsburgh, Pa., a corporation of Delaware Application January 14, 1938, Serial No. 184,980

7 Claims. (Cl. 236—15)

This invention relates to regenerative soaking pit furnaces. More particularly it relates to a control system for automatically operating the fuel and air supply valves and the stack dampers of such a furnace for maintaining constant the temperature, gas pressure, and other conditions within the furnace. The invention also contemplates certain specific improvements in regenerative soaking pits which are fully set forth hereinafter.

Regenerative soaking pits as constructed heretofore have usually been arranged in a battery and provided with means for reversing the direction of firing of all holes or pits in the battery simultaneously. Such arrangement is objectionable since it does not permit any flexibility in the control of the several holes and precludes the use of automatic control since conditions may vary among the several holes of a battery so that an adjustment (of fuel or air supply or the like) which would be appropriate for one hole might lead to a serious disturbance of the conditions in another.

I have invented a novel arrangement of soaking pits, together with an automatic control system therefor which overcomes the aforementioned objections. In accordance with my invention, each hole of a battery is controlled, and the direction of firing therethrough reversed, entirely independently of the other holes in the battery. The automatic control system includes means for regulating the supply of fuel and air in accordance with the pit temperature to maintain the latter substantially constant, as well as means responsive to the pressure of the combustion gases in the pit for controlling the stack dampers. The latter are also automatically controlled to effect reversal of the direction of firing at predetermined intervals.

Further details and advantages of the invention will become apparent as the following detailed description proceeds. This description is to be read in connection with the accompanying drawings illustrating a present preferred embodiment with a modification. In the drawings:

Figures 1A, 1B and 1C constitute a diagrammatic layout of a battery of soaking pits having the invention associated therewith;

Figure 2 is a circuit diagram illustrating connections between the various electric elements shown in Figures 1A and 1B;

Figure 5 is a diagram showing the manner in which Figures 1A, 1B and 1C should be positioned to be read as a single figure.

Figures 1C, 3:
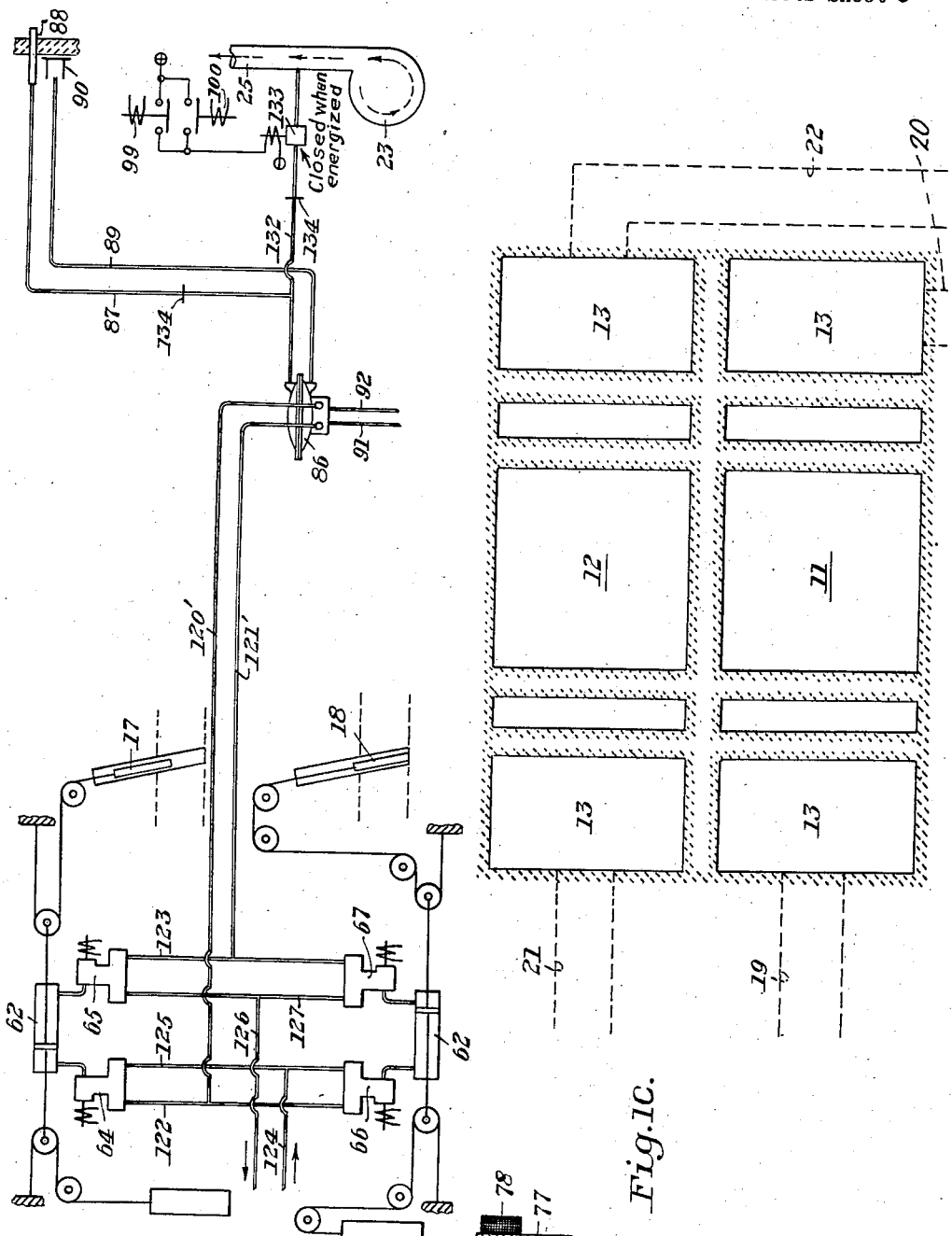
Figure 3 is a partial diagrammatic layout illustrating a modification.

Referring now in detail to the drawings, and for the present to Figures 1A, 1B and 1C, soaking pits 10, 11 and 12 arranged in any convenient manner are each provided with regenerators 13 at opposite ends thereof. These may be of known construction and serve in the usual manner to absorb heat from waste gases discharged from the furnace pits and subsequently, on reversal of the direction of firing, for preheating the air supplied thereto for combustion. Passages 14 and 15 extend from the regenerators associated with the pit 10 to a stack flue 16. The flue is connected with a stack (not shown). The flow of waste gases from the furnace through the passages 14 and 15 is controlled in a manner to be explained more fully hereafter by dampers 17 and 18. Passages 19 and 20 are connected to the regenerators of the pit 11 and passages 21 and 22 to the regenerators of pit 12, serving the same purpose as the passages 14 and 15.

The following description will be confined to the control mechanism and operation of the pit 10 but it will be understood that similar control equipment is provided for the pits 11 and 12 whereby the latter operate in the same manner as the pit 10, although each pit operates independently of all the others.

General arrangement

Air for combustion is delivered alternatively to either of the regenerators at the opposite ends of the pit 10 by a blower 23 driven by a motor 24. The blower 23 supplies air to a main duct 25 having branch ducts 26 and 27 connected thereto. The ducts 26 and 27 communicate respectively with the passages 14 and 15. The volume of air passing through the main duct 25 is controlled by a valve 28. The valve 28 is operated by a double acting fluid-pressure cylinder and piston 29 controlled by a regulator 30 in a manner to be described more fully later.

The flow of air through the ducts 26 and 27 is controlled by valves 31 and 32. The valves 31 and 32 are provided with self closing springs and pneumatic actuators 33 of the diaphragm type effective to open the valves on the admission of air under pressure thereto. Compressed air for supplying the actuators 33 is maintained in a storage tank T. Electro-magnetic valves 34 and 35 are connected in a piping system indicated generally at 36 for controlling the operation of the actuators 33. These valves are 3-way valves. When their solenoids are energized, the valves connect the actuators to the compressed air supply. When the solenoids are de-energized, the valves cut off the air and vent the actuators to atmosphere.

I provide means for supplying two different types of fuel to the furnace 10 and means for automatically controlling the supply of either. A blast-furnace gas main 37 has branches 38 and 39 leading to headers 40 associated with the regenerators 13 of the pit 10. A coke-oven gas main 41 has branches 42 and 43 leading to headers 44 communicating with inlet chambers 44a on opposite sides of the pit 10.

A shut-off valve 45 is disposed in the main 37 and a similar valve 46 in the main 41. These valves permit either source of fuel to be used at will. These valves have fluid-pressure cylinders and pistons 47 and 48 similar to that shown in 49. One or the other of the valves 45 and 46 is always held closed. The position of the other valve is controlled by a regulator 49 to maintain the proper pressure on the fuel supplied to the furnace. Connections 49a extend from the regulator 49 to the mains 37 and 41.

The branches 38 and 39 extending from the main 37 are provided with valves 50 and 51 having pneumatic actuators 52 similar to those shown at 33. These actuators are controlled by electro-magnetic valves 53 and 54 similar to those shown at 34 and 35. Valves 55 and 56 are connected in the branches 42 and 43 and are operated by actuators 57. The latter are controlled by valves 53 and 54 simultaneously with the actuators 52.

Regulating valves 58 and 59 in the mains 37 and 41 are actuated simultaneously by a motor controller 60. The latter is actuated in accordance with the indication of a recording pyrometer 61 having a thermo-couple in the pit 10, by means already known which require no detailed description. The operation of the pyrometer 61 and the controller 60 is such that the supply of fuel is regulated in accordance with the furnace temperature to maintain the latter substantially constant.

Figure 4:
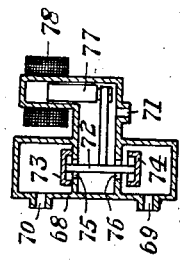
Figure 4 is a transverse sectional view of an electro-magnetic valve, several of which are employed in the system of my invention.

The dampers 17 and 18 serve both as reversing valves to control the direction of firing of the pit 10 and as regulating valves to maintain a pre-determined pressure of the combustion gases within the pit. Double acting fluid pressure cylinders and pistons 62 are provided for operating the dampers 17 and 18. Counterweights 63 are provided to facilitate the operation of the dampers. The operation of the damper 17 is controlled by electro-magnetic valves 64 and 65. Similarly, the damper 18 is controlled by valves 66 and 67. These valves are identical and the structure thereof is shown more clearly in Figure 4. Each valve comprises a casing 68, having ports 69, 70 and 71. A valve stem 72 is reciprocable in the casing 68 and has valve disks 73 and 74 adapted to cooperate with seats 75 and 76 respectively. The stem 72 is connected to an armature 77 cooperating with a solenoid 78. When the solenoid is de-energized the armature 77 falls to the position illustrated in 54, whereupon the valve disk 73 engages its seat and the valve disk 74 moves away from its seat. Ports 69 and 71 are thus connected when the solenoid is de-energized. When the solenoid is energized, the armature 77 and valve stem 72 are raised. The valve disk 73 then moves away from its seat and the valve disk 74 engages its seat. The ports 70 and 71 are thus connected.

The operation of the dampers 17 and 18 is further controlled by electro-magnetic valves 79 and 80 similar to that which has just been described. Fluid under pressure for operating the pistons in the cylinders 62 is delivered by a pump 81, to the outlet of which is connected a high pressure pipe line 82. The pump is driven by a motor 83 and draws fluid from a reservoir 84 to which is connected a low pressure or return pipe line 85.

It will be understood that the dampers 17 and 18 are alternately opened and closed when it is desired to reverse the direction of firing in the pit 10. The means for doing this automatically will be described hereafter. The damper which is open is adjusted automatically by means of a regulator 86 to maintain the desired pressure of combustion gases in the pit 10. This regulator is of the diaphragm type. One side of the diaphragm thereof is connected to a pressure impulse pipe line 87 terminating in a nipple 88 extending into the pit 10. The other side of the diaphragm is connected to a compensating pipe line 89 terminating in a recess 90 in the wall of the pit 10. The regulator 86 is thus actuated by the velocity pressure of the combustion gases flowing through the pit 10. In accordance with this pressure the regulator controls the admission of fluid under pressure from a branch 91 connected to the pipe line 82, to port 70 of the valve 79, and the return of the low pressure fluid from valve 80 to a branch 92 extending from the low pressure pipe line 85. These operations and the connections between the regulator and valves will be more fully described below.

In a similar manner, the regulator 30 controls the valve 28 to change the volume of air supplied in accordance with the changes in the amount of fuel delivered. The regulator 30 thus controls the fuel-air ratio. It includes a pair of diaphragms and connections 93 and 94 to opposite sides of orifice plates 95 in the air and gas mains. The regulator 30 operates the cylinder and piston 29 to shift the valve 28 sufficiently to maintain a constant ratio between the volume of fuel and the volume of air delivered to the furnace for combustion. Connections 96 extend from the cylinder 29 to the regulator 30 which is also connected to the branches 91 and 92 from the high pressure and low pressure lines 82 and 85.

The pressure regulator 49 similarly controls the valves 45 and 46. Three way cocks 97 are provided whereby the regulator 49 may be made responsive either to the pressure in the main 37 or that in the main 40 and to control either the valve 45 or the valve 46. Additional cocks 98 determine whether the valves 50 and 51 or the valves 55 and 56 are operated by electro-magnetic valves 53 and 54. To change from one fuel to another, therefore, it is only necessary to change the setting of the cocks 97 and 98. This may be accomplished manually with the apparatus shown, or by remote control if electro-magnetic valves are employed instead of manually operated cocks.

The electrical connections between certain of the elements already described are illustrated in Figure 2, together with the additional devices necessary to make the operation of the system entirely automatic. The various electro-magnetic valves 34, 35, 53, 54, 64 through 67, 79 and 80 are shown in Figure 2 in the electrical circuits whereby they are controlled and are designated by the same numerals as in Figures 1A and 1B.

In addition to the elements already described, Figure 2 includes master relays 99 and 100. These relays, together with the various electro-magnetic valves, are adapted to be energized by current from a supply circuit indicated at 101. Protective devices connected between the supply circuit 101 and the various electro-magnetic devices adapted to be energized therefrom, include relays 102 and 103 and a limit switch 104. The operating coil of the relay 102 is connected across the motor 24 driving the blower 23. The operating coil of the relay 103 is similarly connected across the motor 83 driving the pump 81. The limit switch 104 is controlled by the cover of the pit 10 (not shown) and is opened as soon as the cover is moved from its closed position. By means of these devices the entire automatic control system is rendered ineffective in any emergency. Should the current supply for either of the motors 24 or 83 be interrupted for any reason, one or the other of the relays 102 and 103 would operate to open its contacts, since the latter are held closed only so long as the operating coils of the relays remain energized. The same result would be produced by moving the furnace cover away from its closed position. A manual switch 105 is provided for by-passing the cover limit switch 104 in case it is desired under certain conditions to continue operation under automatic control after the cover has been moved off the pit.

*Description of operation—Starting—Normal conditions*

With the contacts of the various protective devices in the closed position, as illustrated in Figure 2, the system may be placed in operation under automatic control by closing the push button switch 106. This switch has a closing push button 106a and an opening push button 106b as shown. As soon as the switch 106 is closed a signal lamp 107 is energized to show that the automatic control system is functioning. The closing of the push button 106 also energizes a contact-actuating mechanism 108, providing a selector switch 109 is in engagement with its left hand contact. The mechanism 108 may be of any desired construction and operates contacts 110 and 111. One or the other of the two sets of contacts is always closed and the relative positions of the contacts are reversed periodically by the mechanism 108. In simplest form this mechanism might be a constant speed motor driving a cam shaft effective to operate the contacts periodically, in a predetermined order which will be explained below. It is desirable, furthermore, that means be provided for adjusting the time interval between reversals of the contacts. The specific mechanism for controlling the contacts 110 and 111, however, need not be described in detail since such devices are well known.

Additional groups of contacts 112 and 113 are operated in accordance with the position of the switch 109, e. g., by being mounted on a common operating shaft. When the switch 109 is in the illustrated position, the contacts 112 are closed and the contacts 113 are opened. The contacts 110 and 111 may be described as reversing contacts because when their relative positions are changed the direction of firing of the pit 10 is reversed. With these reversing contacts in the positions illustrated in Figure 2, electro-magnetic valves 35, 64 and 65 are energized, the circuits therefor extending from the left hand contact of switch 109 (which is connected to the left hand conductor of the supply circuit 101 by the various protective devices and the push button switch 106) by way of the upper contact 111, the second contact of group 112 from the left, thence through the solenoids of the electro-magnetic switches to a common return conductor 114 connected to the right hand side of the circuit 101 through the various protective devices and the push button switch 106.

The solenoids of the electro-magnetic valve 54 and the master relay 100 are also energized by reason of the fact that limit switches 115 and 116 connected in series therewith are closed for reasons which will be apparent later. The circuit for energizing the valve 54 and the relay 100 is similar to that just traced and includes lower contact 111, the first contact from the left in the group 112, limit switches 115 and 116, the solenoid of valve 54 and the relay 100 in parallel, thence by the return conductor 14 to the supply circuit. Indicating lamps 117 and 118 are also energized as will be readily apparent as they are connected in parallel with the solenoids of valves 35 and 54 respectively. The energization of relay 100 completes an obvious energizing circuit for the solenoids of electro-magnetic valves 79 and 80. The circuit extends from the left hand conductor of the supply circuit by a branch 119 through the contacts of the relay 100 to the solenoids of the valves 79 and 80 and thence by the return conductor 114 to the right hand side of the supply circuit.

As explained above, the operating coils of electromagnetic valves 35, 54, 64, 65, 79 and 80 are now energized. The energization of the solenoids of valves 79 and 80 connects conduits 120 and 121 leading from the regulator 86 to conduits 122 and 123. The latter extend from valves 64 and 65 and the energization of the solenoids of these valves as above described causes opposite ends of the cylinder 62 to be connected to the conduits 122 and 123. With this accomplished, the damper 17 is actuated by the piston in the cylinder 62 in accordance with the pressure in the pit 10. As already explained, the regulator 86 connects the conduits 120 and 121 to the high pressure and relief branches 91 and 92 depending upon the pit pressure. In this way fluid under pressure is supplied to and relieved from opposite ends of the cylinder 62 to adjust the position of the damper 17 in accordance with the pit pressure.

The energization of the solenoid of valve 35 opens the valve 32 admitting air for combustion in the furnace from the main duct 25 through the branch duct 27 to the passage 15. The damper 18 having been closed in a manner which will be explained later, the air for combustion traverses the generator 13 on its way toward the pit 10.

The energization of the solenoid of the valve 54 causes the opening of one of the valves 51 and 56 depending on which source of fuel is being utilized. In either case the fuel is mixed with the air and the mixture passes into the furnace for combustion. The resulting pressure of combustion gases in the pit operates the regulator 86 in the manner described to control the extent to which the damper 17 is opened. The valve 28 is controlled by the regulator 30 to proportion the air flow to the flow of fuel.

A cycle of firing from right to left having thus been started, continued operation is controlled by the various regulators. The volume of fuel delivered from the source thereof is controlled by one of the valves 58 and 59 through the motor controller 60 which is actuated in accordance with the temperature in the pit as indicated by the thermo-couple of the pyrometer 61. The regulator 30 controls the supply of air in accordance with the supply of fuel to maintain constant the ratio between the volumes thereof.

The regulator 86 operates the stack damper 17 to maintain the pressure of combustion gases in the furnace constant at the desired value, closing the damper when the pressure falls and opening it when the pressure rises. In accordance with the usual practice, the air entering the right hand regenerator is pre-heated before combustion and the waste gases leaving the pit serve to heat the left hand re-generator before passing along the passage 14 to the stack flue 16.

Automatic reversal—First stage

Conditions continue as described until the end of the time for which the reversing mechanism 108 is set. At that time, the contacts 111 are opened and contacts 110 are closed in a predetermined order, viz., (1) lower contact 111 opened, (2) upper contact 111 opened and lower contact 110 closed, and (3) upper contact 110 closed. The opening of the lower contact 111 de-energizes lamp 18, the solenoid of valve 54 and the relay 100. The latter in turn de-energizes the solenoids of valves 79 and 80. The de-energization of the solenoid of valve 54 causes the closing of one or the other of valves 51 and 56 depending upon which fuel is being employed. This terminates the supply of fuel to the pit.

When the flow of fuel is terminated by the de-energization of the solenoid of valve 54, the regulator 30 operates to close the valve 28 because the regulator always maintains the valve 28 in a position to provide an air flow proportional to the flow of fuel.

The de-energization of the solenoids of valves 79 and 80 causes conduits 122 and 123 to be connected to the relief line 85 and the high pressure line 82 respectively, for the purpose of opening valve 18 in a manner which will be described shortly.

The upper contact 111 is next opened, de-energizing the solenoids of valves 35, 64 and 65.

The de-energization of the solenoids of valves 64 and 65 causes the latter to connect the opposite ends of the cylinder 62 associated with damper 17 to the conduit 125 and a similar conduit 127 respectively. These conduits are permanently connected by conduits 124 and 126 to the high pressure line 82 and the relief line 85 respectively. As a result, fluid under pressure is admitted to the left hand end of the cylinder 62 and relieved from the right hand end whereby the damper 17 is promptly closed. The limit switch 116 is operated by damper 17, being opened when the damper 17 is closed, and closed as soon as the damper starts to open. The circuit in which the switch 116 is connected is already broken, however, at the lower contact 111. The closing of the damper also closes a limit switch 128 which will be referred to again later. This switch is closed when the damper is closed and opened as soon as the damper begins to open.

As a result of the de-energization of the solenoid of valve 35, the latter closes and permits valve 32 to be closed by its self-closing spring to cut off the supply of air to the passage 15.

The first part of the reversing operation is now completed since fuel and air have been cut off from the right hand end of the furnace and the damper 17 closed.

Automatic reversal—Second stage

The lower contact 110 is closed simultaneously with the opening of the upper contact 111. The closing of the lower contact 110 energizes the solenoids of valves 34, 66 and 67 and energizes the signal lamp 129. The energization of the solenoids of valves 66 and 67 connects the right hand end of the cylinder 62 associated with the damper 18 with high pressure line 82 through valve 80, which remains de-energized, and the left hand end of the cylinder to the relief line 85 through valve 79. The damper 18 is thus promptly opened. In opening, the damper 18 opens the limit switch 115 and closes a limit switch 130. These limit switches are associated with the damper 18 and are operated thereby in the same manner as switch 116 and 128 are operated by damper 17.

The energization of the solenoid of valve 34 causes the opening of valve 31 to connect branch 26 of the air supply to passage 14.

The limit switch 128 having been closed by the closing of damper 17 and the limit switch 130 by the opening of damper 118, a circuit is prepared for energizing a signal lamp 131, the solenoid of valve 53 and the relay 99. This circuit is completed when the upper contact 110 is closed. The energization of the solenoid of valve 53 causes the opening of the valve 50 or valve 55, depending on the source of fuel being used. Fuel is thereupon supplied to the pit and regulator 30 causes valve 28 to open whereby a proportional amount of air is also delivered to the pit. The energization of relay 99 causes the solenoids of valves 79 and 80 to be energized. The resulting operation of these valves connects the control conduits 120 and 121 to opposite ends of the cylinder 62 associated with damper 18 whereby the latter, after its initial opening, is automatically controlled by the regulator 86. The latter causes the damper to move toward closed position when the pit pressure falls and vice versa.

The entire reversing operation has now been completed because, as stated above, as soon as fuel is supplied to the left hand end of the pit, the valve 28 will admit air thorugh the branch 26 to the passage 14; and the opening of damper 18 permits combustion products to pass along passage 15 to the stack flue 16. The firing of the furnace continues under automatic control until the end of the next half of a complete operating cycle. During this time, as in the previous half cycle, the supply of fuel is controlled by the pyrometer 61 and the motor controller 59. The volume of air is controlled by the regulator 30 in accordance with the volume of fuel supplied and the opening of the stack damper is controlled by the regulator 86 to insure that the pressure of gases in the pit remain substantially constant.

Second reversal

At the end of the next half cycle of operations, the sequence of changes previously described is repeated. The contact actuating mechanism 108 causes contacts 110 and 111 to operate in the reverse of the order previously described, the upper contact 110 being opened first. This de-energizes the solenoid of valve 53 and the relay 99. The valve 53 terminates the fuel supply while the relay 99 de-energizes the solenoids of valves 79 and 80 disconnecting the control conduits 120 and 121 from the cylinder 62. On termination of the fuel supply, regulator 30 closes valve 28.

The lower contact 110 is next opened and the upper contact 111 closed. The former cuts off the air supply by de-energizing the solenoid of valve 34 and de-energizes the solenoids of valves 66 and 67.

The de-energization of the solenoid of valve 66 connects the left hand end of the cylinder 62 associated with the damper 18, to the conduit 125 which is connected by conduit 124 to the high pressure line 82. The right hand end of the cylinder is similarly connected by the de-energization of the solenoid of valve 67, to the conduit 127 and thence by conduit 126 to the relief line 85. The damper 18 is thus closed, opening the limit switch 130 and closing the limit switch 115.

The closing of the upper contact 111 energizes the solenoids of valves 35, 64 and 65 and lamp 117. The energization of the solenoid of valve 35 causes opening of the valve 32 in the branch 27. The energization of the solenoids of valves 64 and 65 causes the right hand end of the cylinder 62 associated with damper 17 to be connected to the high pressure line 82 and the left hand end to the relief line 85 through valves 79 and 80, the solenoids of which remain de-energized.

The lower contact 111 then closes completing the circuit of the solenoid of valve 54, relay 100 and lamp 118. The operation of the valve 54 causes the opening of one of the fuel valves 51, 56. The operation of relay 100 causes the energization of the solenoids of valves 79 and 80 which connect the cylinder 62 through valves 66 and 67 to control conduits 120 and 121 extending to the regulator 86.

The second reversal of a complete cycle is thus effected and the cycle will be repeated at the desired intervals so long as the switch 106 remains closed.

If it is desired to reverse the direction of firing manually, this may be done by operating switch 109 and contacts 112 and 113 to their alternate positions. The opening of contacts 112 disconnect the valve solenoids and relays already described from the reversing contacts 110 and 111 while the closing of contacts 113 connects manual reversing switches 132 and 133 in circuit to control the valve solenoids and relays. The movement of switch 109 to its right hand contact de-energizes the contact-actuating mechanism 108 and completes the circuit from the switches 132 and 133.

When changing from automatic to manual reversing, the manual reversing switch corresponding to the direction of firing then in progress should be closed before the switch 109 and contacts 112 and 113 are operated. When it is desired to effect a manual reversal, the reversing switch which is closed is opened and the opened switch closed. The contacts of the manual reversing switches are constructed to operate sequentially in a manner corresponding to that of contacts 110 and 111, and effect reversal of the direction of firing the pit in the same manner as the latter.

When it is desired to shut down the pit 10, it is only necessary to press the button 106b of switch 106. This immediately de-energizes the solenoids of the valves controlling the supply of fuel and air and de-energizes the master relay (99 or 100) which is energized at the instant, to cause de-energization of the solenoids of the valves 79 and 80. In the manner already described, this causes the closing of the damper valve which happens to be open, because the solenoids of the valves associated with the open damper (either 64 and 65 or 66 and 67) are likewise de-energized.

Assuming that, at the instant of shutdown, the damper valve 17 is open, the de-energization of the solenoid of valves 79 and 80 causes the valve 17 to close, as described under "Automatic reversal—First stage," because the solenoids of valves 64 and 65 are de-energized simultaneously with the de-energization of the solenoids of valves 79 and 80, the current supply to all valve solenoids and master relays 99 and 100 being interrupted by the opening of switch 106. The damper valve 18, being closed at the instant of shutdown, remains closed because to open it requires energization of the solenoids of valves 66 and 67.

It will be apparent that the opening of the contacts of relay 102 or the opening of limit switch 104 would have the same result as just described. The by-passing switch 105 permits continuation of pit firing while the cover is moved off sufficiently to permit the flame to be observed. The opening of the contacts of relay 103 on failure of the current supply of pump motor 83 would shut off the fuel and air.

In a modified form of the invention, I dispense with the valves 79 and 80, and connect the regulator 86 permanently to conduits 122 and 123. This modification is shown in Fig. 3 wherein conduits 120' and 121' extend from the regulator 86 to the conduits 122 and 123. In this system, instead of conecting the cylinder 62 directly to the high pressure and relief lines 82 and 85 to effect full stroke operation of the dampers 17 and 18, I provide means for artificially loading the regulator 86 at the time of reversal so that such full stroke operation will result. This means includes a connection 132 from the air supply duct 25 to the impulse line 87, a solenoid valve 133 in said connection and orifice plates 134 in the impulse line 87 and the connection 132. The valve 133 is constructed to close when its solenoid is energized. This solenoid is connected in the circuit shown in Fig. 2 in place of the solenoids of valves 79 and 80 and is energized when either of the relays 99 and 100 closes its contacts.

Except for the features just described, the modified system is the same as that of Figures 1A, 1B, 1C and 2 but the remainder of the system has not been duplicated in the drawings. In explaining the operation of the system of Fig. 3, however, the existence of the other elements of the system first described will be assumed.

When the elements of Fig. 3 occupy their illustrated positions, the pit 10 will be fired from right to left since the damper 17 is opened and the damper 18 closed. The fuel and air are delivered and controlled in the manner previously explained. The solenoids of valves 64 and 65 are energized to connect opposite ends of the cylinder 62 associated with damper 17 to the regulator 86 through conduits 122, 123 and 120' and 121' whereby the regulator operates the damper to maintain the desired pressure of gases in the pit. The relay 100 is energized in the same manner as in the system of Fig. 2, and, in turn, causes the solenoid of valve 133 to be energized. This cuts off the impulse line 87 from the air duct 25.

When the contact actuating mechanism 108 operates the contacts 110 and 111, in the manner previously set forth, the fuel and air are cut off from the right hand end of the furnace and the relay 100 is de-energized as are also the solenoids of valves 64 and 65. The latter cause the damper 17 to be closed as previously explained.

De-energization of the solenoid of valve 133 permits the valve to be opened by any suitable means, such as a biasing spring, whereupon the full pressure developed by the blower 23 is communicated through connection 132 to the impulse line 87. The air pressure applied to the impulse line 87, because of the location of the orifice plates 134 artificially loads the regulator 86, causing it to operate as if excessive pressure existed in the pit. The normal operation of the regulator under such condition is to effect opening of the damper to which it is connected at the time. Since the de-energization of the solenoids of valves 64 and 65 has cut off the cylinder 62 associated with damper 17 from the regulator 86, the latter is effective, as soon as the solenoids of valves 66 and 67 are energized, to cause full opening of the damper 18. As already explained, energization of the solenoids of valves 66 and 67 occurs in due course during the reversing operation. Air and fuel are likewise delivered to the left hand side of the pit by operation of other elements of the automatic control system, whereupon firing in the reverse direction (left to right) proceeds immediately. The relay 99 is energized during the course of the reversing operation and causes energization of the solenoid of valve 133. As before, this cuts off the impulse line 87 from the air supply duct 25 and artificially loading of the regulator 86 is terminated. Thereafter, the regulator operates the damper in accordance with the actual gas pressure in the pit.

The numerous advantages of the invention will be readily apparent from the foregoing description. The provision of a completely automatic control system eliminates all manual operations which have heretofore been necessary in reversing regenerator furnaces. The invention also makes it possible to control independently each hole of a battery of soaking pits. The reversing dampers are employed as regulating dampers, thus saving the initial cost of a special draft regulating damper and adapting the system to certain applications where such additional regulating damper cannot be employed.

The fuel supply is controlled automatically to maintain the desired temperature in the pit and the air supply is regulated in proportion to the volume of fuel supplied. Alternate fuel supply systems are provided and means whereby one or the other can be brought into action at any time. The stack draft is regulated to maintain the desired pressure of gases in the pit.

Numerous safety and interlocking features have been provided. Failure of the air supply causes the system to shut down automatically. The same is true of movement of the cover of the pit from its closed position, except when it is desired to observe the flame conditions in the pit. In case of failure of the supply of hydraulic pressure utilized to operate various valves, the fuel and air are cut off automatically. The damper limit switches prevent initiation of firing in either direction until the dampers are in proper position.

Manual control means are provided to permit automatic reversal to be suspended if desired. The various steps performed in a reversing operation are indicated by signal lamps so that the condition of all the elements may be determined by a quick observation.

Although I have illustrated and described herein but a preferred embodiment and one modification of the invention, it will be clear that changes in the construction and operation disclosed may be made without departing from the spirit of the invention or the scope of the appended claims.

I claim:

1. A control system for a regenerative furnace having reversing dampers, comprising means for periodically closing one damper and opening another, and means responsive to the pressure of the gas in the furnace for controlling the extent to which the open damper is opened.

2. A control system for a regenerative furnace having reversing dampers, one of which is normally closed and the other open to an extent such as to maintain a predetermined pressure in the furnace, comprising means responsive to said pressure for controlling the open damper, and means for applying periodically to said pressure-responsive means a temporary, artificial loading effective to cause quick opening of the damper which is to operate next as a pressure regulating damper, before the normal gas pressure has actually been built up in the furnace.

3. In a furnace, a combustion chamber, reversing dampers adapted to be alternately opened and closed to reverse the direction of firing through said chamber, and means for regulating the position of the open damper in response to variations in the pressure of combustion gases in said chamber.

4. A control system for a regenerative furnace having air and fuel supply means and reversing dampers, comprising means for closing one of said dampers and opening the other including a reversing controller and means for actuating said controller at predetermined intervals, and automatic control means responsive to the pressure of the gases in the furnace for regulating the position of the open damper between operations of said controller.

5. In a method of operating a regenerative pit furnace having reversing dampers, including the steps of firing the furnace in one direction after closing one damper and opening the other, reversing the relative positions of the dampers and reversing the direction of firing, and automatically varying the position of the open damper in accordance with the gas pressure in the furnace to maintain said pressure substantially constant.

6. In a regenerative furnace, reversing dampers adapted to be alternately opened and closed on reversal of the direction of firing, power-operated means for actuating said dampers, a regulator responsive to the gas pressure in the furnace, said regulator being adapted to be connected selectively to the actuating means of whichever damper is open at a given time, to effect adjustment thereof, means for reversing the relative positions of the dampers, and means effective on reversal of the dampers to disconnect said regulator from the actuating means of the damper which was formerly open and connect it to the other damper-actuating means.

7. A control system for a regenerative furnace having reversing dampers and fuel and air valves, said system including individual actuators for each damper and valve, an electro-magnetic control device governing each actuator, means biassing said control devices to cause closing of the valves and dampers when said control devices are de-energized, said control devices being connected to a common supply circuit through a master controller, a blower supplying air to said furnace, a motor driving said blower, and a relay adapted when de-energized to open said circuit, said relay being so connected as to be energized so long as said motor is energized.

ORVILLE D. RICE.